United States Patent
Bostick et al.

(10) Patent No.: US 8,405,874 B2
(45) Date of Patent: *Mar. 26, 2013

(54) USER DEFINED ASSOCIATIONS OF COLORS TO CARTRIDGES FOR COLOR PRINTERS

(75) Inventors: James E Bostick, Cedar Park, TX (US); Brian W Hansen, Cedar Park, TX (US); John Paul Kaemmerer, Pflugerville, TX (US); Raghuraman Kalyanaraman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,183

(22) Filed: Mar. 29, 2012

(65) Prior Publication Data

US 2012/0188570 A1    Jul. 26, 2012

Related U.S. Application Data

(63) Continuation of application No. 12/332,426, filed on Dec. 11, 2008.

(51) Int. Cl.
*H04N 1/60* (2006.01)
*B41J 2/17* (2006.01)
*B41J 2/175* (2006.01)

(52) U.S. Cl. ............ 358/1.9; 358/1.13; 347/84; 347/86

(58) Field of Classification Search .......... 358/1.9, 358/1.13, 1.14, 3.06, 2.1, 3.3, 523, 530, 1.12; 347/43, 15, 19, 7, 5, 6, 84, 86, 85, 87, 88, 347/109; 399/8, 27, 28, 29, 30, 85
See application file for complete search history.

(56) References Cited

U.S. PATENT DOCUMENTS

| | | | |
|---|---|---|---|
| 5,663,750 A | 9/1997 | Sakuma | |
| 6,062,670 A | 5/2000 | Iwata | |
| 6,527,366 B1* | 3/2003 | Byers et al. | ............... 347/43 |
| 6,771,378 B2 | 8/2004 | Akiyama | |
| 2003/0072022 A1 | 4/2003 | Someno | |
| 2010/0149558 A1 | 6/2010 | Bostick | |

OTHER PUBLICATIONS

Non-final Office Action, U.S. Appl. No. 12/332,426, filed Dec. 11, 2008, James E Bostick, mailing date Nov. 30, 2011, 15 pages.
Notice of Allowance, U.S. Appl. No. 12/332,426, filed Dec. 11, 2008, James E Bostick, mailing date Mar. 16, 2012, 7 pages.

* cited by examiner

*Primary Examiner* — Charlotte M Baker
(74) *Attorney, Agent, or Firm* — Mark C. Vallone; Amy J. Pattillo

(57) ABSTRACT

A printer status interface controller displays an interface at a client system with a first color from among a plurality of colors associated with a first print cartridge position associated, from among a plurality of print cartridge positions of a printer. The printer status interface controller receives a user selection within the interface to specify an association of a second color from among the plurality of colors with the first print cartridge position. Responsive to the user selection to associate the second color with the first print cartridge position, a printer color association controller adjusts a reference to the first color in a print document to print in the second color through a second print cartridge in a second print cartridge position from among the plurality of print cartridge positions.

12 Claims, 6 Drawing Sheets

USER DEFINED ASSOCIATIONS OF COLORS TO CARTRIDGES FOR COLOR PRINTERS

CROSS-REFERENCE TO RELATED APPLICATIONS

This application is a continuation of commonly assigned U.S. patent application Ser. No. 12/332,426, filed Dec. 11, 2008.

BACKGROUND

1. Technical Field

The present invention relates in general to controlling a printing apparatus, such as a color printer, and more specifically to user defined dynamic associations of colors to cartridges for color printers.

2. Description of the Related Art

Printers have become useful and commonplace output devices for putting the words or images displayed on a screen or held in a file onto paper or other printable surfaces. Some printers include multiple cartridges or implement color separation, to facilitate multi-color printing. For example liquid inkjet printers, laser toner based printers, pen based plotters, and dye-sublimation printers may provide color separation and printing. Many color printers detect or predict the amount of remaining ink of each separate color and can alert a user which ink cartridge is empty and needs to be replaced.

With each color of ink held in a separate reservoir and some ink colors used more frequently than other ink colors, some reservoirs may run out of color and need to be physically replaced before a color print job can be completed. For example, in a print job requiring magenta, yellow, cyan, and black ink, if the magenta cartridge is too low to print, the print job may stall until the magenta cartridge is replaced. In other printers, when a reservoir runs low, the printer may not stop printing a color print job, but instead prints pages with progressively faded shades of color until the ink is completely out and the resulting output pages are unusable.

While some printers may also interface with software that displays the detected levels of ink in each cartridge and alert a user via a display interface when an ink level reaches a minimum threshold, when a color of ink runs out, the user must still physically replace the expired ink cartridge with another cartridge with sufficient ink, in order for the printer to complete the print job. Often times, ink will run out quickly, such that a low ink warning does not provide sufficient time for a user to acquire a new cartridge.

SUMMARY

Therefore, in view of the foregoing, an embodiment of the invention provides a method, system, and computer program product for enabling a user to dynamically adjust the colors associated with an ink cartridge so the user can continue printing on a printer, even when a particular color cartridge is empty, without replacing the color cartridge or manually adjusting the colors within a printed file.

In one embodiment of the invention, a method, system, and computer program product provide for dynamically adjusting a color associated with a cartridge of a printer. A printer status interface controller displays an interface at a client system with a first color from among a plurality of colors associated with a first print cartridge position associated, from among a plurality of print cartridge positions of a printer. The printer status interface controller receives a user selection within the interface to specify an association of a second color from among the plurality of colors with the first print cartridge position. Responsive to the user selection to associate the second color with the first print cartridge position, a printer color association controller adjusts a reference to the first color in a print document to print in the second color through a second print cartridge in a second print cartridge position from among the plurality of print cartridge positions.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

Figure 1:
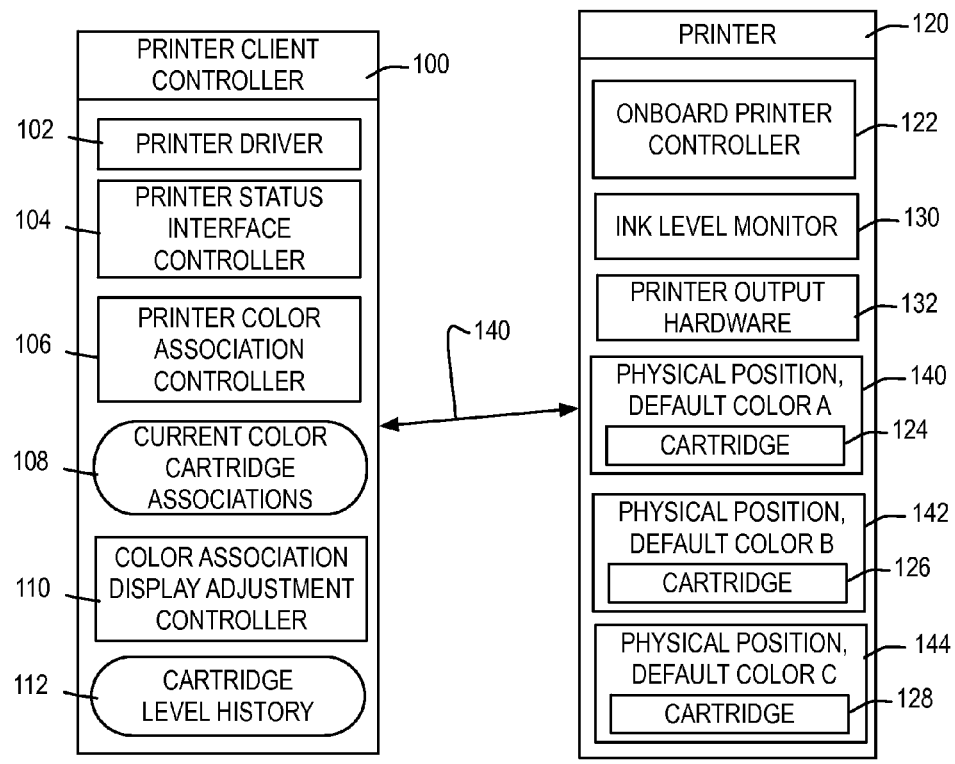
FIG. 1 is a block diagram depicting one embodiment of a printer controller for enabling and implementing user defined associations of colors to cartridges of a printer.

Referring now to FIG. 1, a block diagram depicts one embodiment of a printer controller for enabling and implementing user defined associations of colors to cartridges of a printer.

In the example, a printer client controller 100 includes a printer driver 102 that drives the instructions sent to a printer with multiple cartridges, such as printer 120. In the example, printer 120 includes examples of multiple cartridges 124, 126, and 128, positioned within physical positions 140, 142, and 144, respectively. It will be understood that printer 120 may include additional or alternate numbers of cartridges. In addition, it will be understood that cartridges 124, 126, and 128 may represent separate physical cartridges, may represent separate colors within a single cartridge, or may represent other configurations of different types or colors of ink controlled by onboard printer controller 122 for printing.

An onboard printer controller 122 receives instructions from printer driver 102 and executes the instructions within printer 120. In one example, instructions sent by printer driver 102 may include a file for printing, where printer driver 102 formats the file for the printer. In another example, instructions sent by printer driver 102 include a file for printing and specific instructions to facilitate onboard printer controller 122 formatting the file for printing on the printer. In yet another example, instructions sent by printer driver 102 to onboard printer controller 122 may include an instruction to cancel a print job, pause a print job, reorder a print job or adjust the print job.

Onboard printer controller 122 includes printer output hardware 132 for performing and monitoring physical print operations. In one example, printer output hardware 132 may include, but is not limited to, printer heads, paper sensors, and paper feeders, which control and monitor printing output.

Onboard printer controller 122 assigns each of physical positions 140, 142, and 144 to a separate default color and controls printing of requested colors in a print file by printing from cartridges assigned to the default colors associated with physical positions 140, 142, and 144 to reflect the requested colors. In the example, physical position 140 is assigned a default color A, physical position 142 is assigned a default color B, and physical position 144 is assigned a default color C. In one example, each of physical positions 140, 142 and 144 may be visibly labeled with the default color assigned to the physical position to guide the user in positioning ink cartridges within printer 120. Printer 120 may also detect whether the actual ink color in a positioned cartridge matches the default color for a physical position and onboard printer controller 122 may calibrate ink use from each of cartridges 124, 126, and 128 to achieve expected color output.

In the embodiment illustrated, printer 120 includes an ink level monitor 130 that monitors the levels of ink within cartridges 124, 126, and 128. In one example, ink level monitor 130 may implement sensors such as electrodes or a light beam, which sense when an ink level is reduced below a designated level. In another example, ink level monitor 130 may infer an ink level by counting a number of operations emitting ink from a print head of printer output hardware 132 and detecting when the number of operations exceeds an average number of operations allowed before the ink level is reduced below a designated level. It will be understood that ink level monitor 130 may implement additional or alternative methods for monitoring ink levels. In addition, it will be understood that printer client controller 100 may implement an ink level monitor in addition to, or as an alternative to ink level monitor 130.

Onboard printer controller 122 detects printer status information from ink level monitor 130 and printer output hardware 132 and other components within printer 120 and communicates current printer status information to printer client controller 100. In one example, onboard printer controller 122 detects current ink levels from ink level monitor 130 and communicates the current ink levels to printer client controller 100. In another example, onboard printer controller 122 detects signals from printer output hardware 132 indicating a current functionality of printer heads, current paper levels and positioning, and current functionality of paper feeders and communicates the current functionality of printer 120 to printer client controller 100.

In the example, printer client controller 100 includes a printer status interface controller 104. Printer status interface controller 104 controls a selectable interface for displaying current printer status information received from printer 120 and facilitating a user selection of options for specifying a color within a print file to print to one of cartridges 124, 126, and 128, as positioned within physical positions 140, 142, and 144. In particular, printer status interface controller 104 controls a selectable interface for facilitating a user selection of options for associating a color with a cartridge, other than the default color assigned to the cartridge position. For example, physical position 140 is assigned to "default color A", however printer status interface controller 104 may facilitate a user selection to associate "color B" with physical position 140, such that print requests for "default color A" are dynamically adjusted to be printed by cartridge 126, which is assigned to "default color B".

As a user dynamically selects to associate particular, non-default colors with cartridges within printer status interface controller 104, current color cartridge associations 108 is updated to reflect the current associations. In addition, as a user associates particular, non-default colors with cartridge positions within printer status interface controller 104, a printer color association controller 106 dynamically adjusts the colors within a printable file to reflect the colors associated with the cartridge positions and directs printer driver 102 to request printing of the file as adjusted. Further, as a user associates particular, non-default colors with cartridges, a color association display adjustment controller 110 facilitates display of a printable document to reflect the expected color output of the document.

By enabling a user to dynamically define the color associated with a print cartridge through printer status interface controller 104, printer client controller 100 enables a user to adjust the color requests made to printer 120 for a print file job, without the user having to replace empty cartridges and without the user having to manually adjust the color settings of a file to be printed. For example, a document may include a portion of text highlighted with a yellow color. If the yellow ink cartridge is empty, rather than edit the document itself to highlight areas of the document with a different color of ink or physically replace the yellow ink cartridge, a user may select within a printer status interface to associate cyan with the default yellow cartridge. Printer color association controller 106 detects the association and automatically adjusts any yellow ink requests within the document to print requests in cyan through the cyan color cartridge.

In addition, printer client controller 100 may include a cartridge level history 112, where printer driver 102 stores a history of cartridge ink levels, print jobs, and times, in cartridge level history 112. Printer status interface controller 104 may control a selectable option that enables a user to select to automatically adjust the associations of color with cartridges to maximize cartridge use based on previous cartridge use accessed from cartridge level history 112. In one example, printer color association controller 106 may additionally analyze the cartridge ink level values over time and update cartridge level history 112 with predicted ink level use and recommended color to cartridge associations.

Further, printer driver 102 may update cartridge level history 112 with an entry each time a cartridge is replaced or printer color association controller 106 may infer a new cartridge from changes in cartridge ink levels over time. Printer status interface controller 104 may control a selectable option that enables a user to select to automatically adjust the associations of color with cartridges to use the oldest ink first. In one example, printer color association controller 106 may analyze current cartridge ink level values over time and update cartridge level history 112 with records ordering the cartridges from oldest to youngest.

Printer status interface controller 104 may control a selectable option that enables a user to select to automatically adjust the associations of color with cartridges dependent upon the type of document, such as for a document labeled as a type "draft", where current color cartridge associations 108 include user designations of colors applicable to "draft" types of documents. Printer color association controller 106 may further analyze cartridge level history 112 to determine which cartridges should be used first from among the selection of cartridges associated for a "draft" document.

Figure 3:
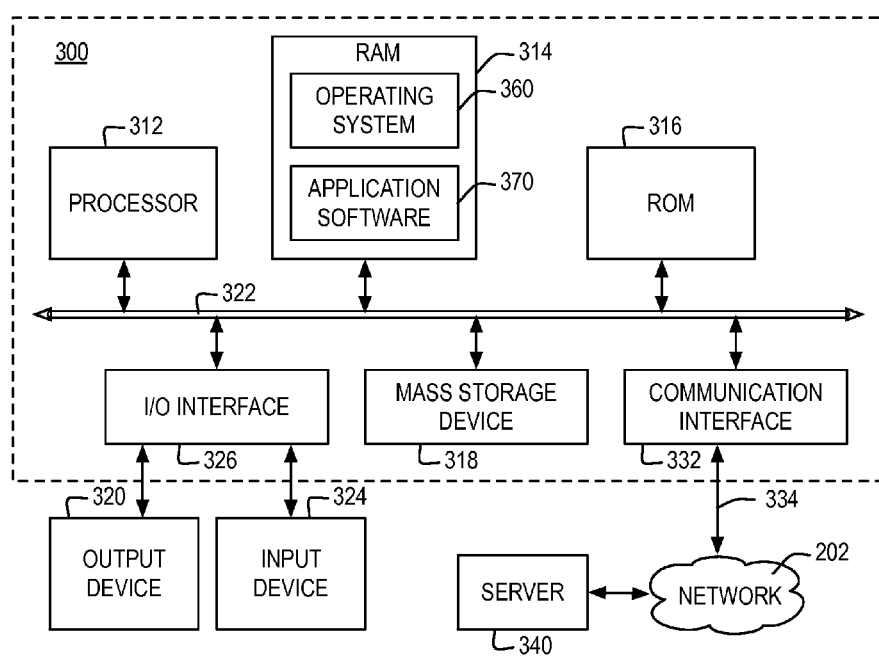
FIG. 3 is a block diagram depicting an example of a computer system in which the present invention may be implemented.

While in the embodiment depicted in FIG. 1 printer client controller 100 includes printer driver 102, printer status interface controller 104, printer color association controller 106, current color cartridge associations 108, and color associations display adjustment controller 110, it will be understood that the components or modules implemented within printer controller 110 may be implemented within a computer system, such as computer system 300 to be further described with reference to FIG. 3, may be distributed across multiple computer systems, may be incorporated within one another, or may be plug-ins to other components or modules.

In addition, while in the embodiment depicted in FIG. 1 printer 120 includes onboard printer controller 122, ink level monitor 130, printer output hardware 132, and cartridges 124, 126, and 128, it will be understood that the components or modules implemented within printer 120 may be implemented within a computer system or implement a computer system, such as computer system 300 or may be distributed across multiple computer systems.

Further, while in the embodiment depicted in FIG. 1 printer client controller 100 and printer 120 are depicted as separate components, connected via a communication medium 140, it will be understood that printer client controller 100 and printer 120 may be integrated into a stand-alone printer system.

Figure 2:
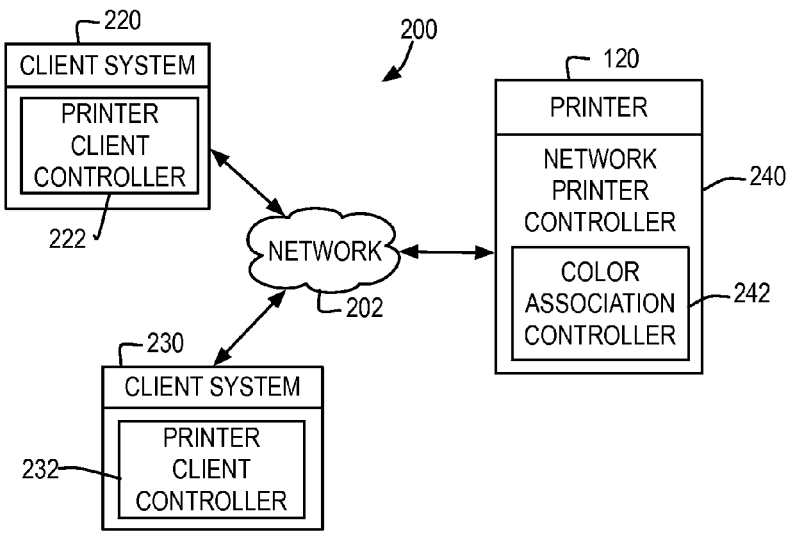
FIG. 2 is a block diagram illustrating one embodiment of a network environment for managing printing from client systems to network printers.

With reference now to FIG. 2, a block diagram depicts one embodiment of a network environment for managing printing from client systems to network printers. In the example, in a network environment 200, a network 202 communicatively connects multiple systems, such as client system 220, client system 230, and printer 120. Network 202 may include, but is not limited to, packet-switching networks, such as the Internet or an intranet, and telephony networks. In addition, network 202 may include routers, switches, gateways, and other hardware to enable a communication channel between client system 220, client system 230, and printer 120. Further, while in the example client system 220, client system 230, and printer 120 are depicted as communicating via network 202, in an alternate embodiment, one or more of the systems may be incorporated within network 202.

In the example, client system 220 includes a printer client controller 222 and client system 230 includes a printer client controller 232, where printer client controller 222 and printer client controller 232 include one or more components illustrated in printer client controller 100 of FIG. 1. Client systems 220 and 230 may send print job requests to one or more network printers, such as printer 120 via network 202.

In addition, in the example, printer 120 is enabled as a network printer through a network printer controller 240, which connects printer 120 to network 202 and may include network functions for responding to requests from printer client controllers at multiple client systems. In the example, network printer controller 240 also includes a color association controller 242.

In one example, color association controller 242 analyzes incoming print job requests from multiple printer client controllers to determine the color cartridges required for each print job, calculates a total expected ink requirement for queued jobs, and compares the requirements with the current ink levels, to predict whether any print jobs waiting in the queue will not be processed due to lack of ink. In the case where color association controller 242 predicts a print job waiting in the queue will not be processed, color association controller 242 may predict ink colors that will be available for a print job and send the predictions to the print client controller that sent the print job, wherein the user may select an option within printer status interface controller 104 to adjust the predicted color settings for the print job to reflect the predicted ink availability. In addition, or alternatively, color association 242 may adjust the ink levels for printer 120 distributed to printer client controller 222 and printer client controller 232 to reflect the current ink levels reduced by the queued jobs.

In another example, printer client controller 222 or printer client controller 232 may each report the current color cartridge associations for a print job to color association controller 242 and color association controller 242 may distribute current color cartridge associations among the different client systems.

In yet another example, a printer status interface controller of printer client controller 222, for example, may include an option for a user to select to apply the user's current color cartridge associations to all print jobs by printer 120 or to all users of printer 120. In particular, one user, such as a network administrator may need an option for temporarily controlling the color cartridge associations allowed for printer 120. Printer client controller 222 sends the request to apply the user's current color cartridge associations to printer 120 to color association controller 242. Color association controller 242 may apply the user's current color cartridge associations to pending print jobs for printer 120 and may send the user's current color cartridge associations to other printer client controllers, such as printer client controller 232, for restricting color cartridge associations at other printer client controllers sending print jobs to printer 120.

Referring now to FIG. 3, a block diagram illustrates an example of a computer system in which the present invention may be implemented. The present invention may be executed in a variety of systems and combinations of systems, made up of functional components, such as the functional components described with reference to computer system 300 and may be communicatively connected to a network, such as network 202.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be a general-purpose processor such as IBM's PowerPC (PowerPC is a registered trademark of International Business Machines Corporation) processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control management of content displayed on portable, content adjustable identification devices as depicted in the operations of flowchart of FIGS. 7-9 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, such as mass storage device 318, a random access memory (RAM), such as RAM 314, a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in broadband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 300, partly on the user's computer, as a stand-alone software package, partly on the user's computer and partly on a remote computer or entirely on the remote computer or server, such as a server 340. In the latter scenario, the remote computer may be connected to the user's computer through any type of network, such as network 202, through a communication interface 332 over a network link 334, that may be connected, for example, to network 202 including a local area network (LAN) or a wide area network (WAN), or the connection may be made to an external computer (for example, through the Internet using an Internet Service Provider). Although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 300, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 300, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, a body scanning system, a keyboard, a mouse, or other input peripheral device, communicatively enabled on bus 322 via I/O interface 326 controlling inputs. In addition, for example, a display device 320 communicatively enabled on bus 322 via I/O interface 326 for controlling outputs may include, for example, one or more graphical display devices, audio speakers, printers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 4:
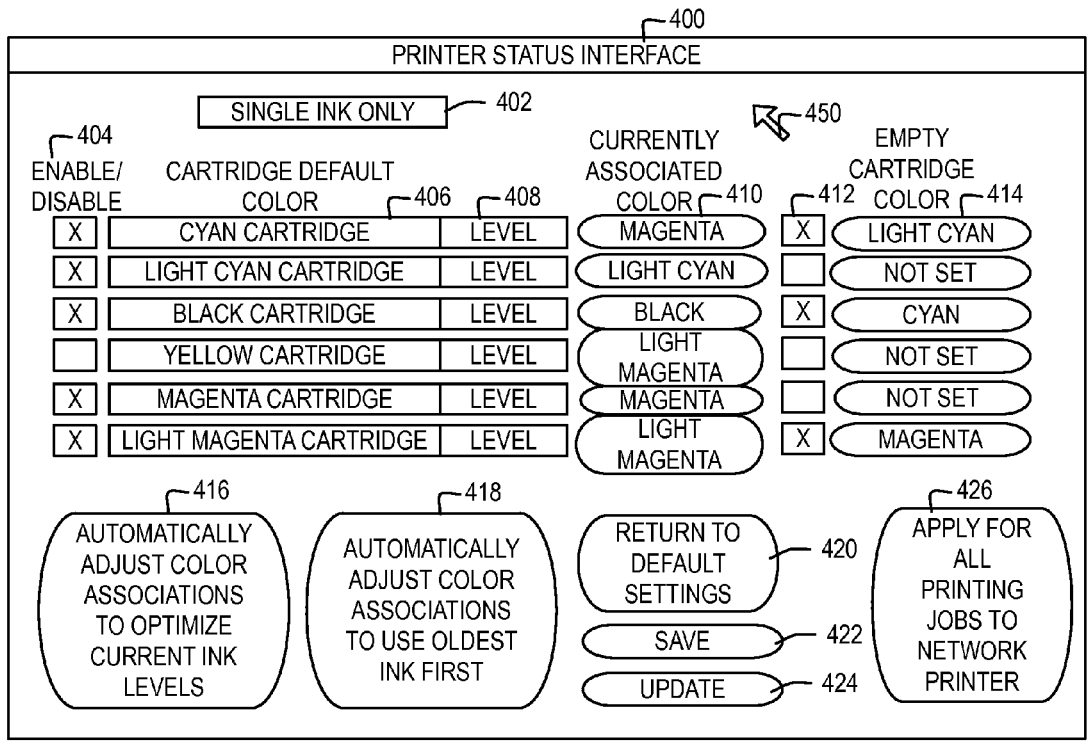
FIG. 4 is a block diagram illustrating one embodiment of a printer status interface through which a user selectively associates colors with cartridges.

With reference now to FIG. 4, a block diagram illustrates one embodiment of a printer status interface through which a user selectively associates colors with cartridges. In the example, a printer status interface 400 includes a selection tool 450. Selection tool 450 is illustrated as an arrow or pointer, which the user may position within printer status interface 400 and use to select options within printer status interface 400. It will be understood that other selection tools may be implemented for a user to select from options within printer status interface 400 and printer status interface 400 may be output through an audio interface or other type of interface, in addition to the display type interface illustrated in FIG. 4.

In the example, the user may select an option to print a file with single ink only, regardless of any colors specified in the file itself, by selecting "single ink only" as illustrated at reference numeral 402. By a user selecting "single ink only" as illustrated at reference numeral 402, printer color association controller 106 may automatically convert any colors within the file to scaled colorings in a single ink color. In addition, by a user selecting "single ink only" as illustrated at reference numeral 402, printer status interface controller 104 may trigger an additional interface illustrated at single ink only interface 500 in FIG. 5, and prompt a user to select to adjust the scaled percentages illustrated in column 504 associated with the file colors illustrated in column 502 and save the settings using selectable save option 506. The file colors illustrated in column 502 reflect the color of cartridge which would otherwise output each file color if the user had not selected the "single ink only" option.

Figure 5:
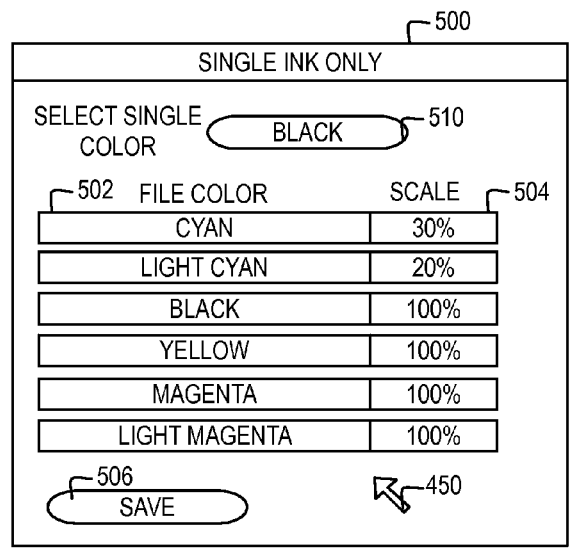
FIG. 5 is a block diagram illustrating one embodiment of a single ink color interface for a user to select a single ink color and set scaled percentages of other colors.

In FIG. 5, by enabling a user to select to print a file in a single ink only, and enabling the user to select the scaled percentage for printer color association controller 106 to apply to the colors in a file, a user can select to highlight particular colors within a printing of a file through scaling of color, without having to manually edit the colors in the actual file. In the example in FIG. 5, the scaling of color for the user selecting the single color of "black", as illustrated at reference numeral 510, set for the colors "cyan" and "light cyan" is "30%" and "20%", respectively. The color scale set for the other colors is "100%", such that "cyan" and "light cyan" will print out at a lighter grey shade than the other colors. It is important to note that in the example, the colors of "yellow", "magenta", and "light magenta" would normally output at lower scaled percentages, to reflect color even when only black ink is used.

Returning to FIG. 4, printer status interface 400 includes a column 406 listing each of the default colors assignments by a printer to printer cartridge positions. In the example, default colors assigned to the cartridge positions include a "cyan cartridge", a "light cyan cartridge", a "black cartridge", a "yellow cartridge", a "magenta cartridge", and a "light magenta cartridge".

In addition, printer status interface 400 includes a column 408 indicating the current ink level, as reported from the printer, for each of the cartridge positions. The ink level may be displayed within printer status interface 400 in multiple formats. For example, the ink level for a cartridge may be displayed as a numerical value, such as a percentage, or a graphical value, such as a bar representative of a percentage.

For each of the default color cartridges, a user may select to enable or disable a particular cartridge from being available for a print job by selecting or deselecting the box in column 404 associated the particular cartridge. In the example, the user has enabled the "cyan cartridge", "light cyan cartridge", "black cartridge", "magenta cartridge", and "light magenta cartridge" and disabled the "yellow cartridge".

In addition, in the example, for each of the cartridges, the user may select in column 410 to associate a color with each assigned default color, where the currently associated color may be different from the default color. The currently associated color in column 410 specifies the color assigned to any print requests for the default color cartridges.

In one example in column 410, the user has selected "magenta" as the currently associated color with two default color cartridges including the "cyan cartridge" and "magenta cartridge". As a result of the user selecting "magenta" as the currently associated color with the two cartridges, printer color association controller 106 will convert any color requests in a print file that are for the colors of "cyan" or "magenta" into color requests for the default "magenta cartridge".

In another example in column 410, the user has selected "light magenta" as the currently associated color with the default color cartridge of "yellow cartridge". As a result of the user selecting "light magenta" as the color currently associated with the "yellow cartridge", printer color association controller 106 will convert any color requests in a print file that are for the colors of "yellow" into color requests for the default "light magenta cartridge".

In addition, in the example, for each of the cartridges, the user may select in column 412 to enable or disable automatic color associations when a cartridge level is empty and may select in column 414 to specify the color to associate with the empty cartridge. In the example, the user has enabled automatic color associations for the "cyan cartridge", "black cartridge", and "light magenta cartridge".

In one example, in column 414, the user has selected to automatically associate the color of "light cyan" with the "cyan cartridge" if the "cyan cartridge" is empty. As a result of the user selection, if printer color association controller 106 detects the "cyan cartridge" is empty, printer color association controller 106 will override any other settings and will automatically convert any color requests in a print file that are for the color of "cyan" into a color request for the default "light cyan" cartridge.

In another example, in column 414, the user has selected to automatically associate the color of "cyan" with the "black cartridge" if the "black cartridge" is empty. As a result of the user selection, if printer color association controller 106 detects the "black cartridge" is empty, printer color association controller 106 will override any other settings and will automatically convert any color requests in a print file that are for the color of "black" into a color request for the default "cyan" cartridge.

In yet another example, in column 414, the user has selected to automatically associate the color of "magenta" with the "light magenta cartridge" if the "light magenta cartridge" is empty. As a result of the user selection, if printer color association controller 106 detects the "light magenta cartridge" is empty, printer color association controller 106 will override any other settings and will automatically convert any color requests in a print file that are for the color of "light magenta" into a color request for the default "magenta" cartridge.

In addition, in the example, printer status interface 400 includes a selectable option 416 to "automatically adjust color associations to optimize current ink levels." In response to a user selection of selectable option 416, printer status interface controller 104 updates the color associations with cartridges in columns 410 and 414 to reflect any recommended color associations specified from cartridge level history 112. For example, if the history of ink usage indicates that the "cyan cartridge" is replaced more often than the "light cyan cartridge", upon a user selection of selectable option 416, printer status interface controller 104 detects the replacement rate for cartridges and may automatically associate "light cyan" with the "cyan cartridge" within printer status interface 400. In another example, printer status interface controller 104 may retrieve recommended color associations from color association controller 242.

In the example, printer status interface 400 includes a selectable option 418 to "automatically adjust color associations to use oldest ink first". In response to a user selection of selectable option 418, printer status interface controller 104 updates the color associations with cartridges in columns 410 and 414 to first use the ink that has been in the printer the longest. In one example, cartridge level history 112 may indicate that the "light magenta cartridge" has been in place for longer than the other cartridges, and may automatically set the color associated with "magenta cartridge" to "light magenta" in column 410, such that the "light magenta cartridge" is used up before the "magenta cartridge."

As illustrated in printer status interface 400, a user may also select selectable option 420 to return to default settings, a selectable option 422 to save the current settings, and a selectable option 424 to update a current print file with the current settings. In addition, printer status interface 400 may include a selectable option 426 to "apply to all printing jobs to network printer". By selecting selectable option 426, printer driver 102 may deliver the associations specified in current color cartridge associations 108 to color association controller 242.

It will be understood that printer status interface 400 may include additional or alternate selectable options and information from the displayed selectable options and information. In addition, it will be understood that printer status interface 400 may be integrated within another printer display interface or may be a stand-alone display interface.

Figure 6:
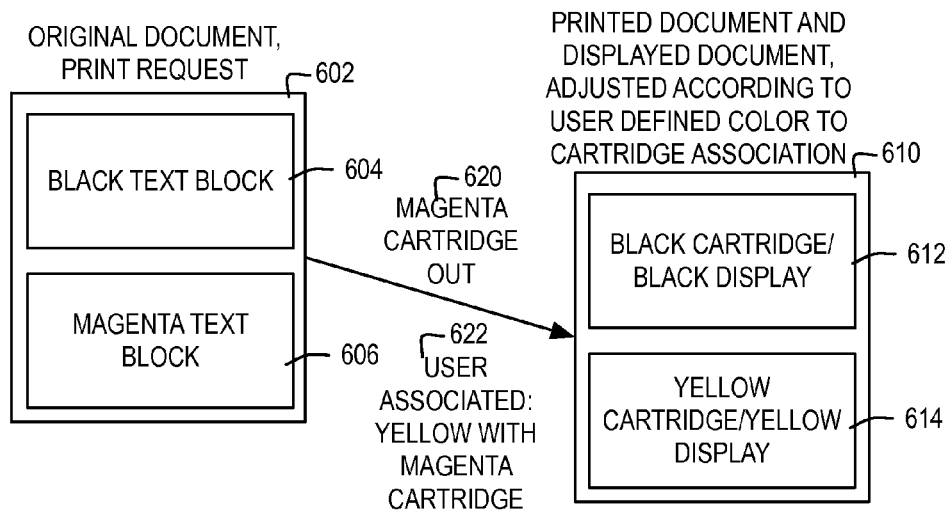
FIG. 6 is a block diagram illustrating one example of a print file adjusted according to the user association of a color with a color cartridge.

With reference now to FIG. 6, a block diagram illustrates one example of a print file adjusted according to the user association of a color with a color cartridge. In the example, an original document in a print request, as illustrated at reference numeral 602, includes a black text block 604 and a magenta text block 606. In the example, as illustrated at reference numeral 620, there is an indication that the magenta cartridge is out of ink. In addition, as illustrated at reference numeral 622, there is an indication that the user has associated "yellow" with the "magenta cartridge". As illustrated, at reference numeral 610, printer color association controller 106 adjusts a print request for the document and a color association display adjustment controller 110 adjusts a display of the document so that black text block 604 prints on the "black cartridge" and displays in "black", as illustrated at reference numeral 612, and magenta text block 606 prints on the "yellow cartridge" and displays in "yellow", as illustrated at reference numeral 614.

In the example, by enabling a user to define the color associated with a cartridge and printer client controller 100 automatically adjusting the print and display of a document to reflect the color association with the cartridge, when a cartridge ink level is empty the user is not required to change out an empty cartridge or edit the color assigned to a text block to continue printing on a printer which stops printing if one cartridge is empty or low until the cartridge is replaced.

In addition, in the example, by enabling a user to define the color associated with a cartridge and printer client controller 100 automatically adjusting the print of a document to reflect the color associations with the cartridge, in a document saved in a file format that does not allow editing without purchase of additional application programs, such as a portable document format (PDF) file where a reader application for the PDF file is free but an editing application for the PDF file requires a purchased license, printer client controller 100 adjusts the actual color output of the document even though a user cannot edit the document to change the colors.

Further, in the example, by enabling a user to define the color associated with a cartridge and printer client controller 100 automatically adjusting the print of a document to reflect the color associations with the cartridge, for a document which includes a photograph, different effects may be introduced through a user defining the color associated with a cartridge, without the user editing the colors of the photograph itself.

In addition, in the example, by enabling a user to define the color associated with a cartridge and printer client controller 100 automatically adjusting the print of a document to reflect the color associations with the cartridge, for a document which includes a color highlight, a user may select through a color association with a cartridge to print a first batch of the document with a first color and a second batch of the document with a second color, without having to change the original color selected in the document.

Figure 7:
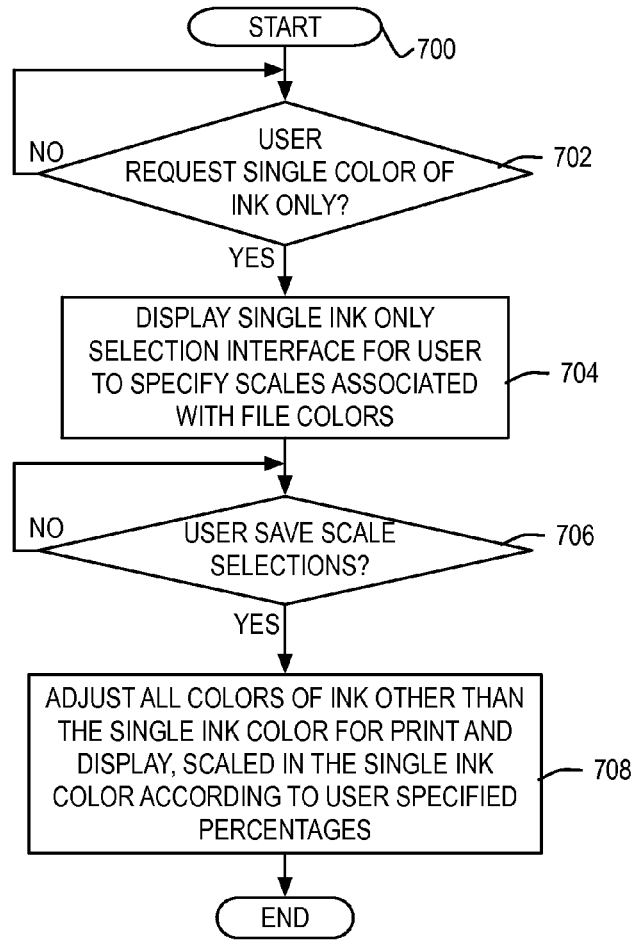
FIG. 7 is a high level logic flowchart depicting a process and program for adjusting printing and display of a file to a single ink cartridge with any colors other than the single ink color scaled according to user specified percentages.

Referring now to FIG. 7, a high level logic flowchart illustrates a process and program for adjusting printing and display of a file to a single ink cartridge with any colors other than the single ink color scaled according to user specified percentages. In the example, the process starts at block 700 and thereafter proceeds to block 702. Block 702 illustrates a determination whether a user requests only a single ink color. If a user requests only a single ink color, then the process passes to block 704. Block 704 depicts displaying a single ink only selection interface for a user to specify scales associated with file colors. Next, block 706 illustrates a determination whether the user selects to save the selections of separate scaled percentages assigned to each of the available colors assigned to cartridges. Thereafter, block 708 depicts adjusting all the colors of ink other than the single ink color for print and display, scaled in the single ink color according to the user specified percentages, and the process ends.

Figure 8:
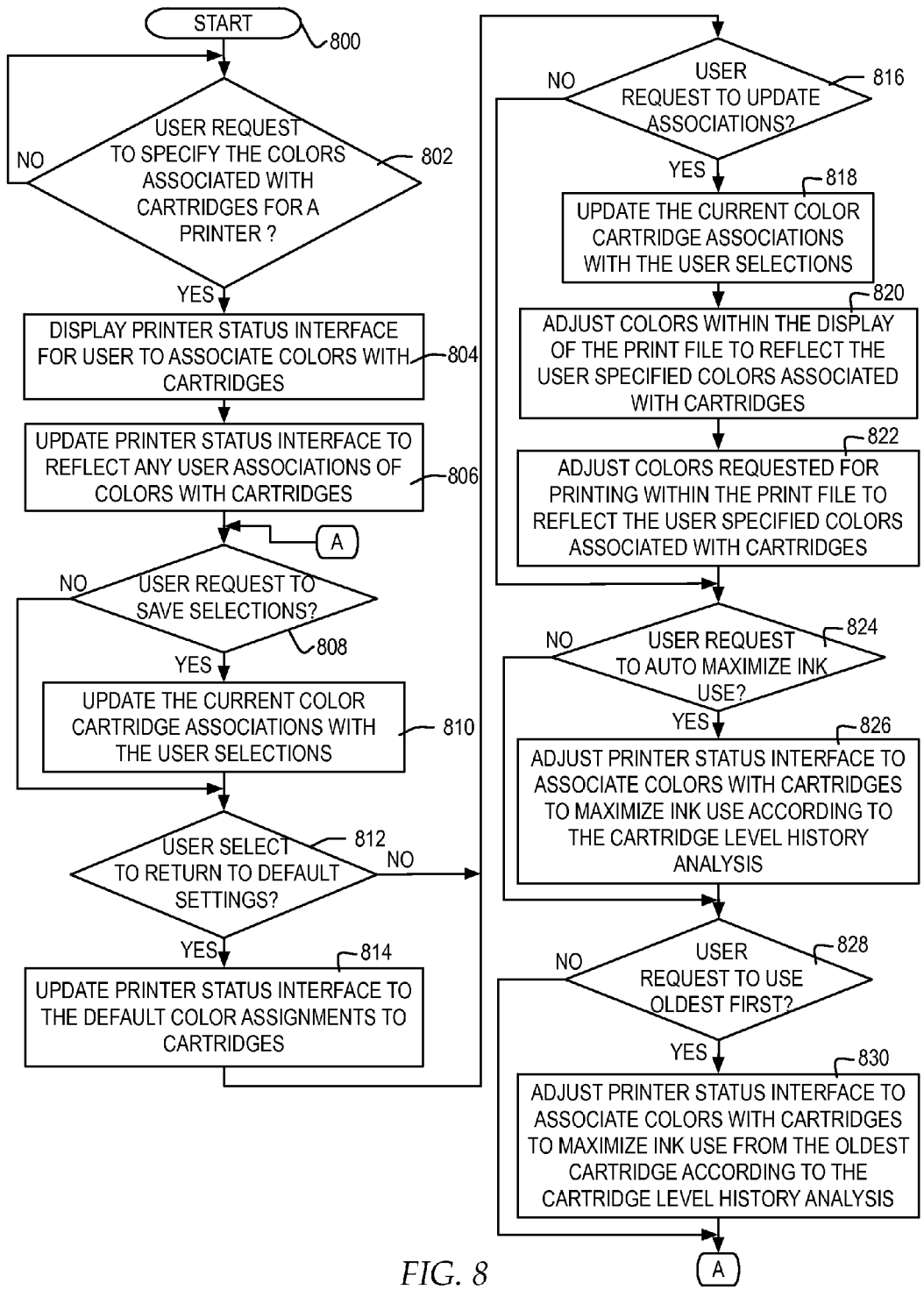
FIG. 8 is a high level logic flowchart illustrating a process and program for enabling a user to associate a color with a cartridge and for adjusting a print request and display of a print file to reflect the user defined associations of colors with cartridges of a printer.

With reference now to FIG. 8, a high level logic flowchart depicts a process and program for enabling a user to associate a color with a cartridge and for adjusting a print request and display of a print file to reflect the user defined associations of colors with cartridges of a printer. As illustrated, the process starts with block 800 and thereafter proceeds to block 802. Block 802 illustrates a determination whether a user requests to specify the colors associated with cartridges for a printer. If a user requests to specify the colors associated with cartridges for a printer, then the process passes to block 804. Block 804 depicts displaying a printer status interface for the user to associate colors with cartridges. Next, block 806 illustrates updating the printer status interface to reflect any user associations of colors with cartridges, and the process passes to block 808.

Block 808 depicts a determination whether the user requests to save selections. If the user requests to save selections, then the process passes to block 810. Block 810 illustrates updating the current color cartridge associations with the user selections, and the process passes to block 812. At block 808, if the user has not requested a save selection, the process passes to block 812.

Block 812 illustrates a determination whether the user selects to return to default settings. If the user requests to return to default settings, then the process passes to block 814. Block 814 depicts updating the printer status interface to the default color assignments to each cartridge, and the process passes to block 816. At block 812, if the user has not requested to return to default settings, the process passes to block 816.

Block 816 depicts a determination whether the user requests to update the current associations for a print file. If the user requests to update the current associations for a print file, then the process passes to block 818. Block 818 illustrates updating the current color cartridge associations with the user selections. Next, block 820 depicts adjusting the colors within the display of the print file to reflect the user specified colors associated with cartridges. Thereafter, block 822 illustrates adjusting the colors requested for printing within the print file to reflect the user specified colors associated with cartridges, and the process passes to block 824. Returning to block 816, if the user has not requested to update the current associations for a print file, then the process passes to block 824.

Block 824 illustrates a determination whether the user requests to auto maximize ink use. If the user requests to auto maximize ink use, then the process passes to block 826. Block 826 depicts adjusting the printer status interface to associate colors with cartridges to maximize ink use according to cartridge level history analysis, and the process passes to block 828. At block 824, if the user has not requested to auto maximize ink use, then the process passes to block 828.

Block 828 depicts a determination whether the user requests to use the oldest cartridge first. If the user requests to use the oldest cartridge first, then the process passes to block 830. Block 830 illustrates adjusting the printer status interface to associate colors with cartridges to maximize ink use from the oldest cartridge according to the cartridge level history analysis, and the process returns to block 808, until a user selects to close the interface. Otherwise, at block 828, if the user does not request to use the oldest cartridge first, then the process returns to block 808, until a user selects to close the interface.

It will be understood by one with skill in the art that blocks 808, 812, 816, 824, and 828 may be separately triggered, out of the order displayed in the process, by a user selection of one of multiple selectable options, where each selectable option triggers a separate block from among block 808, 812, 816, 824, and 828. In addition, it will be understood by one with skill in the art that a user may also select to close an interface and the process returns to block 802, waiting for a request to specify the color associated with cartridges for a printer.

Figure 9:
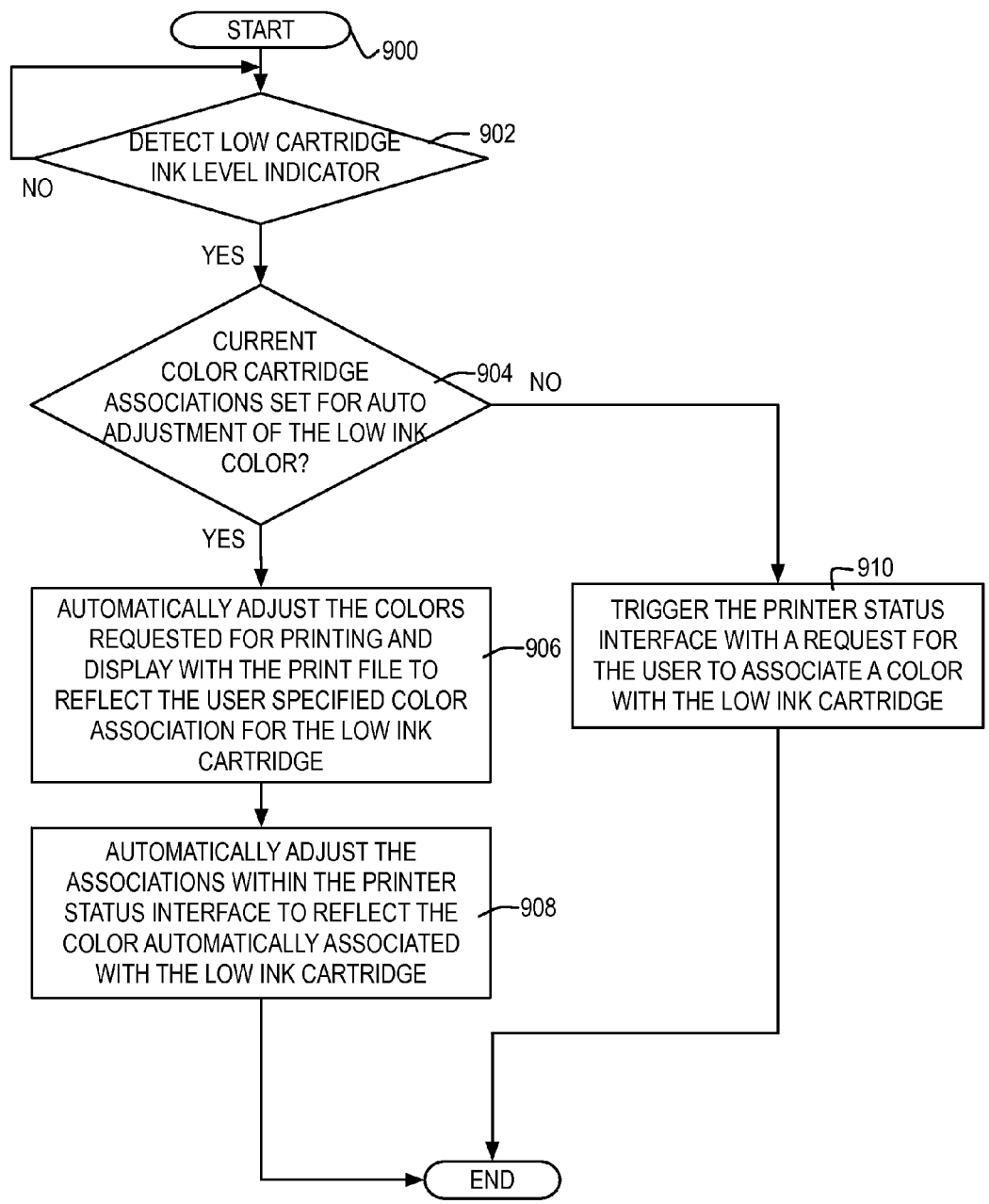
FIG. 9 is a high level logic flowchart depicting a process and program for responding to a low ink cartridge.

Referring now to FIG. 9, a high level logic flowchart depicts a process and program for responding to a low ink cartridge. In the example, the process starts at block 900 and thereafter proceeds to block 902. Block 902 illustrates a determination whether a printer client controller or color association controller detects a low cartridge ink level indicator. If a low cartridge ink level is detected, then the process passes to block 904.

Block 904 depicts a determination whether the current color cartridge associations are set for auto adjustment of the low ink color. If color cartridge associations are set for auto adjustment of the low ink color, then the process passes to block 906. Block 906 illustrates automatically adjusting the colors requested for printing and display with the print file to reflect the user specified color associations for the low ink cartridge. Next, block 908 depicts automatically adjusting the associations within the printer status interface to reflect the color automatically associated with the low ink cartridge, and the process ends.

Returning to block 904, if color cartridge associations are not set for auto adjustment of the low ink color, then the process passes to block 910. Block 910 illustrates triggering the printer status interface with a request for the user to associate a color with the low ink cartridge, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for dynamically adjusting a color associated with a cartridge of a printer, the method comprising:
- a computer displaying an interface with a first color from among a plurality of colors associated with a first print cartridge position of a plurality of print cartridge positions of a printer;
- the computer receiving a user selection within the interface to specify an association of a second color from among the plurality of colors with the first print cartridge position; and
- the computer, responsive to receiving the user selection to associate the second color with the first print cartridge position, adjusting a reference to the first color in a print document to print in the second color through a second print cartridge in a second print cartridge position of the plurality of print cartridge positions.

2. The method according to claim 1, further comprising:
- the computer tracking use of each current cartridge position in the plurality of print cartridge positions over a period of time;
- the computer ordering the use of each current cartridge position from most used cartridge position to least used cartridge position;
- the computer displaying in the interface a selectable option to automatically adjust each association of color with each current cartridge position in the plurality of print cartridge positions to optimize use of each current cartridge position in the plurality of print cartridge positions from the least used cartridge position to the most used cartridge position; and
- the computer, responsive to receiving a user selection of the selectable option to automatically adjust each association of color, automatically adjusting each association of each color with each current cartridge position in the plurality of print cartridge positions to optimize the use of each current cartridge position in the plurality of print cartridge positions from the least used cartridge position to the most used cartridge position.

3. The method according to claim 1, further comprising:
- the computer tracking a separate time of placement of each current cartridge position in the plurality of print cartridge positions over a period of time;
- the computer displaying in the interface a selectable option to automatically adjust each association of color with each current cartridge position in the plurality of print cartridge positions to use an oldest current cartridge to a most recent current cartridge based on the tracked separate times of placement; and
- the computer, responsive to receiving a user selection of the selectable option to automatically adjust each association of color, automatically adjusting each association of each color with each current cartridge position in the plurality of print cartridge positions to use the oldest current cartridge before the most recent current cartridge.

4. The method according to claim 1, further comprising:
- the computer sending the user selection to associate the second color with the first print cartridge position to the printer, wherein the printer is shared on a network; and
- the computer applying, at the printer, the user selection to associate the second color with the first print cartridge position to at least one incoming print job to the printer.

5. A system for dynamically adjusting a color associated with a cartridge of a printer, the system comprising:
- a computer system communicatively connected to a printer;
- the computer system comprising a printer client controller configured to display an interface with a first color from among a plurality of colors associated with a first print cartridge position of a plurality of print cartridge positions of the printer;
- the printer client controller configured to receive a user selection within the interface to specify an association of a second color from among the plurality of colors with the first print cartridge position;
- the printer client controller configured to, responsive to receiving the user selection to associate the second color with the first print cartridge position, adjust a reference to the first color in a print document to print in the second color through a second print cartridge in a second print cartridge position of the plurality of print cartridge positions.

6. The system according to claim 5, further comprising:
- the printer client controller configured to track use of each current cartridge position in the plurality of print cartridge positions over a period of time;
- the printer client controller configured to order the use of each current cartridge position from most used cartridge position to least used cartridge position;
- the printer client controller configured to display in the interface a selectable option to automatically adjust each association of color with each of the plurality of print cartridge positions to optimize use of each current cartridge position in the plurality of print cartridge positions from the least used cartridge position to the most used cartridge position; and
- the printer client controller configured to, responsive to receiving a user selection of the selectable option to automatically adjust each association of color, adjust each association of each color with each current cartridge position in the plurality of print cartridge positions to optimize the use of each current cartridge position in the plurality of print cartridge positions from the least used cartridge position to the most used cartridge position.

7. The system according to claim 5, further comprising:
- the printer client controller configured to track a separate time of placement of each current cartridge position in the plurality of print cartridge positions over a period of time;
- the printer client controller configured to display in the interface a selectable option to automatically adjust each association of color with each current cartridge position in the plurality of print cartridge positions to use an oldest current cartridge to a most recent current cartridge based on the tracked separate times of placement; and
- the printer client controller configured to, responsive to receiving a user selection of the selectable option to automatically adjust each association of color, automatically adjust each association of each color with each current cartridge position in the plurality of print cartridge positions to use the oldest current cartridge before the most recent current cartridge.

8. The system according to claim 5, further comprising:
- the printer client controller configured to send the user selection to associate the second color with the first print cartridge position to the printer, wherein the printer is shared on a network; and
- the printer client controller configured to apply, at the printer, the user selection to associate the second color with the first print cartridge position to at least one incoming print job to the printer.

9. A computer program product for dynamically adjusting a color associated with a cartridge of a printer, the computer program product comprising:
- one or more computer-readable tangible storage devices;
- program instructions, stored on at least one of the one or more storage devices, to display an interface at a client system with a first color from among a plurality of colors associated with a first print cartridge position of a plurality of print cartridge positions of a printer;
- program instructions, stored on at least one of the one or more storage devices, to receive a user selection within the interface to specify an association of a second color from among the plurality of colors with the first print cartridge position; and
- program instructions, stored on at least one of the one or more storage devices, responsive to receiving the user selection to associate the second color with the first print cartridge position, to adjust a reference to the first color in a print document to print in the second color through a second print cartridge in a second print cartridge position of the plurality of print cartridge positions.

10. The computer program product of claim 9, further comprising:
- program instructions, stored on at least one of the one or more storage devices, to track use of each current cartridge position in the plurality of print cartridge positions over a period of time;
- program instructions, stored on at least one of the one or more storage devices, to order the use of each current cartridge position from most used cartridge position to least used cartridge position;
- program instructions, stored on at least one of the one or more storage devices, to display in the interface a selectable option to automatically adjust each association of color with each current cartridge position in the plurality of print cartridge positions to optimize the use of each current cartridge position in the plurality of print cartridge positions from the least used cartridge position to the most used cartridge position; and
- program instructions, stored on at least one of the one or more storage devices, responsive to receiving a user selection of the selectable option to automatically adjust each association of color, to automatically adjust each association of each color with each current cartridge position in the plurality of print cartridge positions to optimize the use of each current cartridge position in the plurality of print cartridge positions from the least used cartridge position to the most used cartridge position.

11. The computer program product of claim 9, further comprising:
- program instructions, stored on at least one of the one or more storage devices, to track a separate time of placement of each current cartridge position in the plurality of print cartridge positions over a period of time;
- program instructions, stored on at least one of the one or more storage devices, to display in the interface a selectable option to automatically adjust each association of color with each current cartridge position in the plurality of print cartridge positions to use an oldest current cartridge to a most recent current cartridge based on the tracked separate times of placement; and
- program instructions, stored on at least one of the one or more storage devices, responsive to receiving a user selection of the selectable option to automatically adjust each association of color, to automatically adjust each association of each color with each current cartridge position in the plurality of print cartridge positions to use the oldest current cartridge before the most recent current cartridge.

12. The computer program product of claim 9, further comprising:
- program instructions, stored on at least one of the one or more storage devices, to send the user selection to associate the second color with the first print cartridge position to the printer, wherein the printer is shared on a network; and
- program instructions, stored on at least one of the one or more storage devices, to apply, at the printer, the user selection to associate the second color with the first print cartridge position to at least one incoming print job to the printer.

* * * * *